United States Patent [19]
Hilbig

[11] 3,981,260
[45] Sept. 21, 1976

[54] ROLLER LIP SEAL FOR SURFACE EFFECT SHIPS

[75] Inventor: Jack H. Hilbig, Chula Vista, Calif.

[73] Assignee: Rohr Industries, Inc., Chula Vista, Calif.

[22] Filed: Aug. 21, 1975

[21] Appl. No.: 606,683

Related U.S. Application Data

[63] Continuation of Ser. No. 534,717, Dec. 20, 1974, abandoned.

[52] U.S. Cl. ............................................. 114/67 R
[51] Int. Cl.² .......................................... B63B 1/36
[58] Field of Search ............ 114/67, 66.5 R, 66.5 S

[56] References Cited
UNITED STATES PATENTS

| | | | |
|---|---|---|---|
| 1,364,470 | 1/1921 | Ziebell | 114/66.5 R |
| 3,146,752 | 9/1964 | Ford | 114/67 A |

Primary Examiner—Stephen G. Kunin
Assistant Examiner—Sherman D. Basinger
Attorney, Agent, or Firm—Patrick J. Schlesinger; Frank D. Gilliam

[57] ABSTRACT

A surface effect-type ship has vertically depending sidewall skirts that define a shock receiving cavity. A compound keel member is pivotally mounted to the forward end of the bow and is adapted to dampen the shock of waves incident thereon. The keel member includes a skeletal structure over which is clad a resilient and deformable skin. That skin deforms due to the wave pressure so as to present a concave surface to the incident waves. This surface partially diverts those waves into horizontal and vertical components. The vertical components may be cushioned by means of an air bag suitably positioned in the cavity behind the keel member. The vertical forces are transferred to the sidewalls and to some extent are canceled since each side of the keel acts to divert waves. Off center waves are dampened by the feature of the entire keel member being pivotable about its longitudinal axis. The keel is provided with such spring loaded means in constant contact with the sidewalls. A roller is connected to the deformable skin with the purpose of dampening the drag of the bow and stern seals.

7 Claims, 6 Drawing Figures

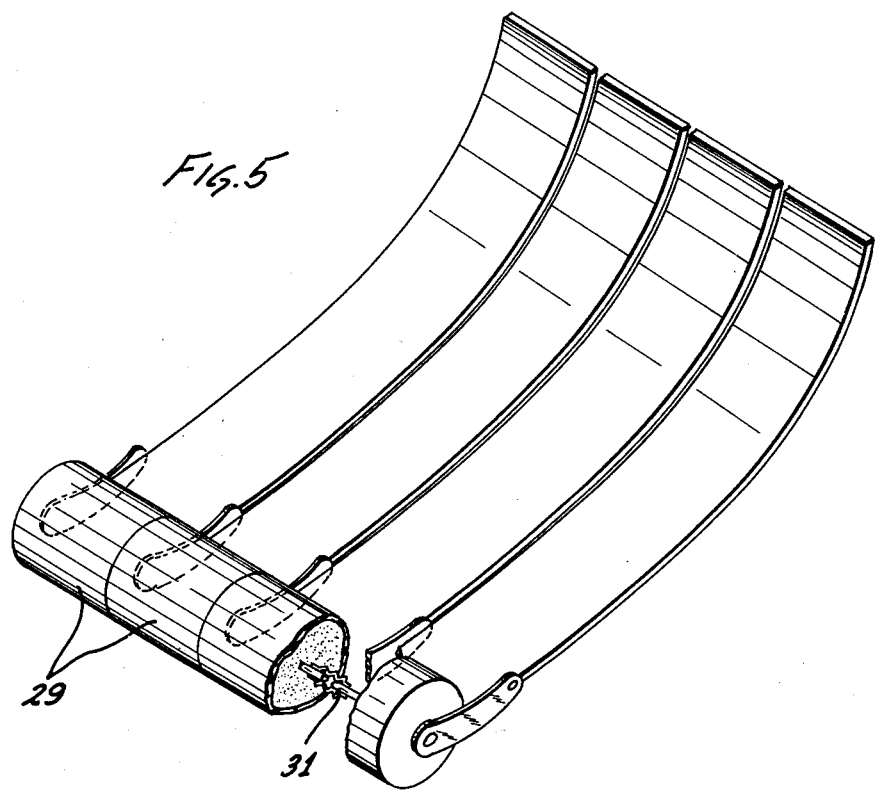
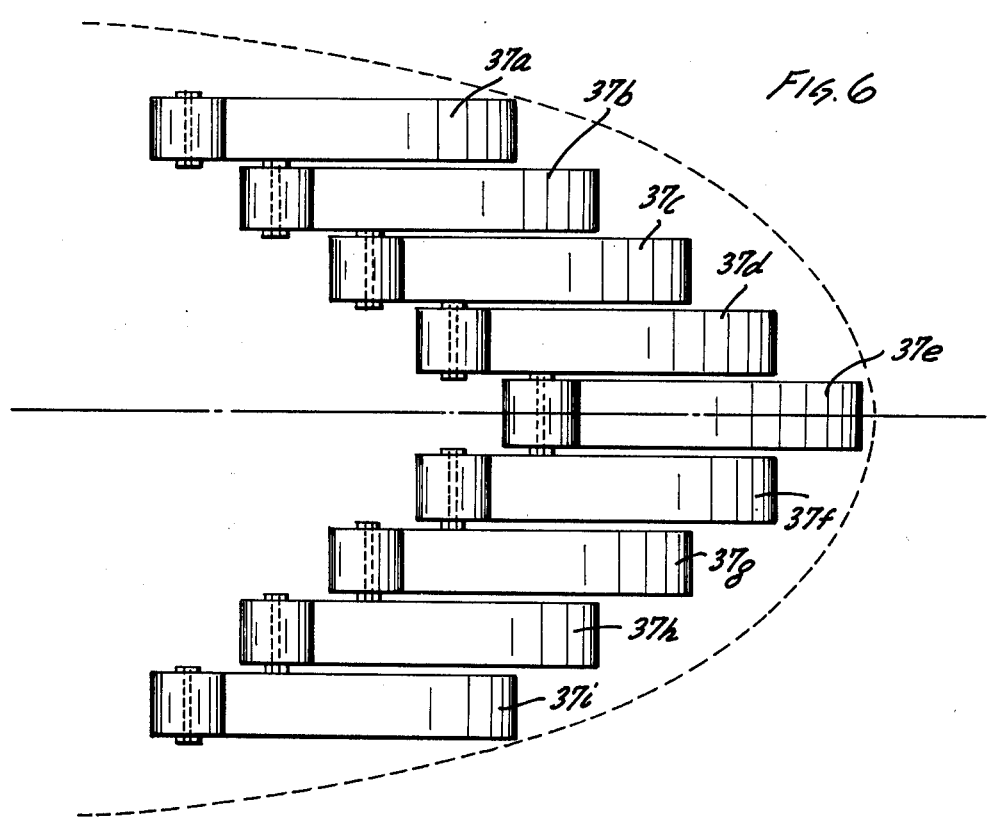

3,981,260

ROLLER LIP SEAL FOR SURFACE EFFECT SHIPS

This is a continuation of application Ser. No. 534,717, filed Dec. 20, 1974, and now abandoned.

BACKGROUND OF THE INVENTION

The present invention relates to a bow seal for a surface effect ship.

Surface effect ships, also known as gas cushion vehicles, are supported, at least in part, by a cushion of pressurized gas formed and contained between the vehicle body and the surface water. As these vehicles operate over turbulent water surfaces, they encounter waves which exert substantial forces on the vehicle body. These waves can be so powerful that heavy damage may be inflicted on the craft.

The new generation of boats are required to operate at speeds in the vicinity of 80–100 knots. Since the sidewalls are thin, they cannot develop such bouyant lift when entering a wave. Thus, the wave is swallowed by the ship causing the bow seal to move up the height of the wave or by plowing a trough in the wave as the ship passes through. The action of the present flat plate type seal induces high acceleration and their resultant loads on the ships. These forces could conceivably be much in excess of the habitability limits.

The instant invention is designed to penetrate the wave as a conventional boat bow does, and at the same time lift up to allow the seal trailing edge to ride over the wave; the horizontal and vertical acceleration forces could be reduced, and this would then permit higher speeds within the habitability limits. The keels of the prior art, by contrast, are made of hinged plates which are exposed to the entire wave shock and transfer the full acceleration thereof into the boat.

A roller is provided at the aft end of the keel with the function being the reduction of drag of the bow and stern seals.

SUMMARY OF THE INVENTION

The seal assembly is characterized by a compound skeleton consisting of a fore-aft beam pivoted at the forward end to the bow structure and a cross-beam at the aft end that extends between the sidewalls.

Side support arms extend from the hull structure to the keel cross-beam to attach or clad a resilient, deformable bow skin to the exterior of the compound keel skeleton. The side support arms are pivoted at their forward ends so as to pivot in a similar fashion as the fore-aft beam. The skin is fabricated from neoprene or the like.

An air bag may be positioned in the cavity defined by the side-wall skirts of the hull. That air bag serves to urge the keel member out from the cavity when the keel member deflects inwardly due to wave shocks and dampen the inward movement.

The keel member is connected to the boat structure with a spherical ball-type joint that allows the keel member to pivot about the bow of the craft as well as rotate about the longitudinal axis of the keel member. This feature allows the trailing edge to contour the water surface.

The loads induced by wave action are reacted by rollers or bearing members at the ends of the cross-beam into the sidewall skirts and also by the flexible skin into the boat structure.

In order to keep the seal near the surface when "off bubble", a buoyant compartment is made of the cross-beam structure.

The keel member is provided with a roller type lip seal which "rides" over the water and reduces drag on the seals of the vessel. The roller adds buoyancy and thus the overall dynamic lift required is reduced.

The above and other aspects of the instant invention will be apparent as the description continues, and when read in conjunction with the appended drawings.

DESCRIPTION OF THE DRAWINGS

FIG. 5 is a perspective view of a multiple roller seal; and

FIG. 6 illustrates, in perspective, another configuration utilizing multiple rollers in which they are offset from each other.

DETAILED DESCRIPTION

Figure 1:
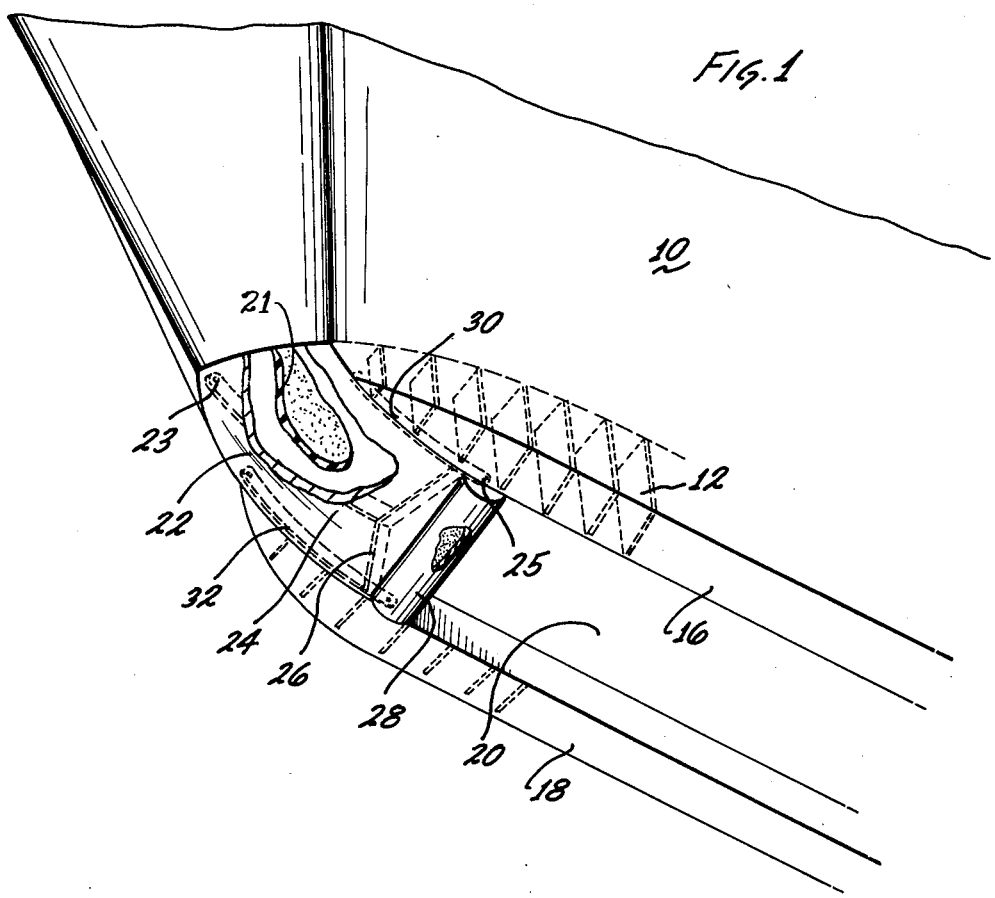
FIG. 1 is a perspective view of the keel incorporating the sealing structure of the present invention.

The basic ship structure 10 embodying the seal is illustrated best in FIG. 1. The internal skeletal structure of the ship is characterized by a series of parallel, spaced panels 12 assembled in pairs on the sides of the keel and gradually increasing in size from the foremost or front panel to the aftmost panel. The panels are rigidly affixed to the deck structure and are also connected to the sidewall skirts 16, 18 which are affixed to the deck structure and extend longitudinally along the underside of the keel the length of the ship, and progressively increasing in area (looking sideways at the structure) fore to aft.

The sidewall skirts 16, 18 define therebetween a compartment or cavity 20 in which the lifting forces are created by a layer of pressurized gas. The details of the structure necessary for the creation of that layer have been omitted since any functional apparatus will suit the purpose of the instant invention. Traditionally, the air pressure lifts the boat structure out of the water and permits its propulsion across the water surface at relatively rapid velocities. This motion is characterized by the skirts; in effect, "cutting" through the water.

As the ship cuts through the water, the collision with waves exerts forces on the ship 10. To absorb these shocks, the ship may be fitted with a resilient, deformable skin 22 which extends from the leading edge of the bow to a distance of about three or four panels aft. In its relaxed position, the skin is disposed to form an integral part of the hydro-dynamic contour of the vessel. Oncoming waves strike the skin 22 and deform it inwardly so as to present a concave form to the wave. This deformation causes the wave to be partially diverted such that some of the force that would normally be incident longitudinally on the keel is turned outwardly or transverse to the longitudinal axis of the vessel. Where the wave strikes the center of the skin 22, it should be evident that each side of the skin deforms so as to equally divert the wave, in which case, the forces created thereby cancel each other out.

The skin 22 is clad over supporting structure defined by a fore-aft keel member 24. That member is connected to the tip of the bow by means of a ball joint type connector 23, for reasons which will be hereinafter explained. A cross-beam 26 is connected to the aft end of the keel member 24 and which beam spans the cavity 20 between the sidewall skirts 16, 18. That member is effective to provide aft support for the skin 22 and due to structure hereinafter described, maintains contact with the sidewall skirts 16, 18.

The basic principle of a roller is that it reduces sliding friction to rolling friction. As a roller is driven over the water surface, it "rolls" on the surface, therefore, the skin 22 is fitted with a roller 28 which rolls on the water and functions to reduce drag. The roller is essentially a foam fitted plastic-cylinder with an axle bearing 25 on each end. The outside surfaces can be smooth or it can have longitudinal surface tension breakers 27 (FIG. 2) to help reduce the spray at high speeds. As shown in FIG. 5, a series of multiple rollers 29 can be employed which act somewhat independently of each other so as to account for variations in wave height across the deformable skin. The roller diameter is determined by the chosen operating speed range of the craft and the RPM that the roller is to have. The limiting RPM is that which produces a spray which impinges on the ship structure.

Figure 3:
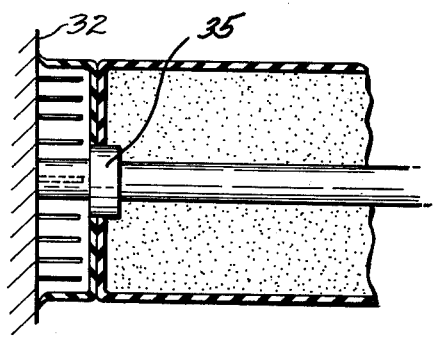
FIG. 3 is a fragmentary view illustrating a brush type seal.
Figure 4:
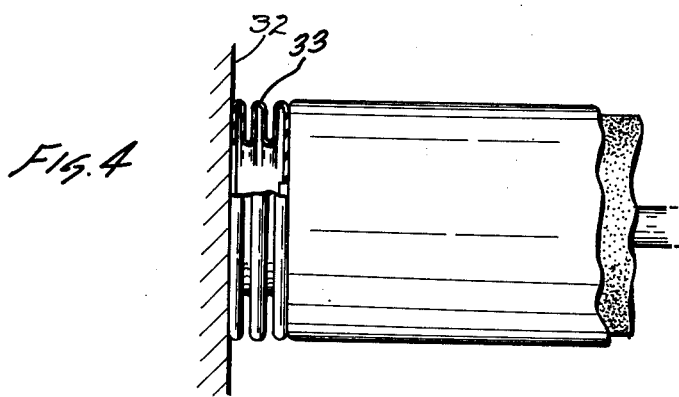
FIG. 4 is a fragmentary view illustrating a bellows type seal.

FIG. 5 illustrates the bellow-like flexible seal segment joint 31 which permits the rollers to act independently but which also is watertight. FIG. 4 illustrates a bellows seal 33 which may be used between the end rollers and side beams 30, 32. In FIG. 3 there is shown a brush seal 35 which can be substituted for the bellows seal as may be desired.

Side beams 30, 32 complete the skeletal structure and are pivoted to the sidewall skirts 16, 18, and rigidly connected to the cross-beam 26. As seen in FIG. 1, the side beams 30, 32 are positioned adjacent the sidewall skirts 16, 18 and provide the side support for the skin 22. The side beams and the keel fore-aft member are all curved to generally conform to the contour of the keel of the vessel. The skin may be attached to the keel skeleton by any convenient means such as studs or bolts inserted through reinforced holes. The precise nature of this connection may vary as long as the connection is secure and structurally sound.

As previously mentioned, the fore-aft keel member 24 is connected to the keel via a ball joint connector 23. This connector permits motion of two types. Firstly, the entire keel structure is permitted to pivot about that connector in the plane of the fore-aft member. The prime mover for this movement, is, of course, the oncoming wave. This action is, in effect, a collapse of the keel so as to absorb and dissipate the energy of the wave. Naturally, the skeletal structure must be returned to its shock absorbing station and to this end, resilient means, in the nature of an air bag 21 or other suitable means, is included between the deck undersurface and the keel skeleton. The exact nature of the means operative for this function forms no primary part of the instant invention and, therefore, the details and principles thereof may vary.

Figure 2:
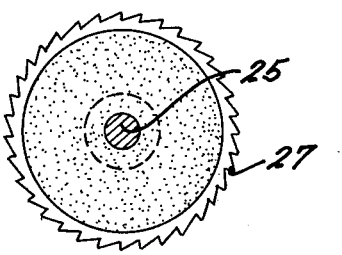
FIG. 2 illustrates a roller with surface tension breakers.

The second type motion permitted by the ball joint connector 23, shown in FIG. 2, is that of rolling about the the fore-aft member 24. This motion is produced by the incidence of an off-center wave, the impact of which is not felt equally by both sides of the skin 22. By permitting the keel structure to roll, off-center waves can be effectively dampened and substantial shocks to the vessel can be avoided. As the keel rolls, the wave deforms the skin, in the area of impact, and diverts the wave so as to reduce the longitudinal forces imparted to the vessel.

In FIG. 6 there is shown a multiple roller arrangement in which the various rollers 37a–37i are offset with respect to each other. In this embodiment, only rollers 37a, e and i actually touch the sidewalls and, consequently, only these rollers need incorporate sidewall seals. The function of this roller arrangement is to permit less then full boat width waves to be attenuated without the action of the entire roller series being actuated. For instance, a wave which is incident and confined to the vicinity of one or the other sidewalls disturbs only a few of the rollers 37.

It has been seen from the foregoing description that the structure embodying the present invention extends the operating habitability limits of the vessel. Ships encompassing this structure can operate when and as needed with little regard to the water surface condition.

Many changes may be made in details of the instant invention, in the method and materials of fabrication, in the configuration and assemblage of the constituent elements without departing from the spirit and scope of the appended claims, which changes are intended to be embraced therewithin.

I claim:

1. In a surface effect ship of a type which comprises vertically depending sidewalls defining a cavity to receive sea wave shocks, a compound keel means which comprises keel skeletal structure means pivotally mounted to the bow of the ship, a resilient shock modulating skin having a sealed attachment to said bow on a portion of said vertically depending sidewalls and connected to and enclosing said skeletal structure, a trailing means connected to the trailing edge of said skin for free movement between said vertically depending sidewalls, said trailing means adapted to smooth out the waves and reduce the drag on the keel and an air bag confined by said cavity and said keel means for biasing said keel toward the sea waves.

2. In the ship of claim 1, said trailing means comprises a series of roller segments each segment adapted to act independently and reduce drag in its immediate vicinity.

3. In the ship of claim 2, seal means connected to the sides of said trailing means and active on the interior of said sidewalls to prevent the passage of water therebetween.

4. In the ship of claim 2 wherein said trailing means comprises surface tension breaker means.

5. In the ship of claim 2, flexible segment joints between each roller segment.

6. In the ship of claim 2, multiple rollers arranged in offset relation between the sidewalls and fore to aft.

7. The ship of claim 1, wherein said trailing means is a roller member.

* * * * *